Patented Nov. 19, 1940

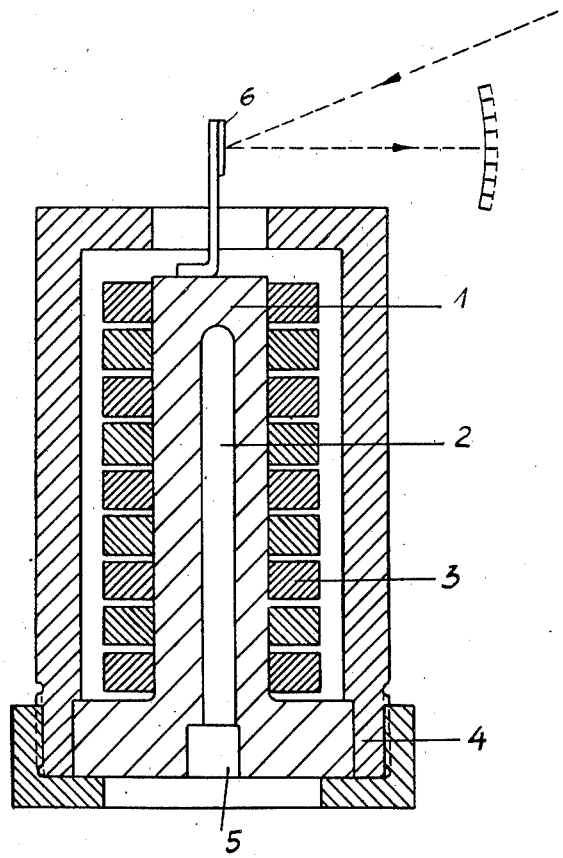

2,222,259

UNITED STATES PATENT OFFICE 2,222,259

APPARATUS FOR MEASURING HIGH PRESSURES

Otto Hoffmann and Werner Francke, Dortmund, Germany

Application February 7, 1939, Serial No. 254,997
In Germany December 13, 1937

1 Claim. (Cl. 73—31)

The present invention relates to an apparatus for measuring high pressures.

The measurement of pressures prevailing in liquids or gases is mainly carried out in practice with the aid of so-called tubular spring manometers. In these devices the measuring means usually consists of a bent metal tube closed at one end and usually of non-circular cross-section. The interior of this tube is under the action of the pressure to be measured. Under the influence of the internal excess pressure, the shape of the measuring tube alters. This alteration in shape is consequently a measure for the size of the pressure and is measured by a suitable device, as for example by a lever mechanism with a pointer and a scale.

In the case of high pressures, the measuring tube must be constructed with strong walls for reasons of strength. The stress occurring at the inner wall of the tube cannot be entirely reduced, however, by increasing the thickness of the walls; even with infinitely great wall thickness there is always present a minimum value. Furthermore the large wall thickness causes a small alteration in shape upon increase of pressure and thus renders the measurement more difficult. Moreover the bending of the tube offers difficulties when the walls are thick.

According to the present invention the bending of the bored spring tube is avoided by the use of a straight rod-shaped body having an eccentric boring in which case the lateral deflection is measured. The rod-shaped body may be provided with a contraction jacket in order to keep the tangential strain on the wall of the boring caused by the internal pressure below the elasticity limits. In this way the measuring range may be extended. By suitable construction (as for example a relatively thin-walled tube with contraction rings) large alterations in shape, which are better to measure, can be obtained. The contraction jacket is subdivided into a large number of small bodies (as for example rings) which are arranged at small distances from each other, or it is constructed as a wire winding so that the alteration in shape of the spring tube is as great as possible and may take place without hindrance. By suitable dimensioning of the intermediate spaces or by the use of other suitable measures, the accumulation of stress occurring in the joints of the contraction rings or wire winding at the surface of the elastic measuring body is kept within permissible limits.

The invention will be further described with reference to the accompanying diagrammatic drawing which, by way of example, illustrates an apparatus in accordance with this invention. It is to be understood, however, that the invention is not restricted to the particular arrangement shown.

Referring to the drawing, a cylindrical body 1 is provided with a boring 2 and is surrounded by a number of shrunk-on rings 3. At its lower end it fits tightly into a housing 4 which acts at the same time as a protecting jacket in the case of any injury to the measuring tube. A pressure conduit is connected at 5. The boring 2 is arranged eccentrically in the body 1, so that under the influence of internal pressure the axis of the body, which in the absence of pressure is straight, becomes bent. The upper end of the measuring tube thus undergoes a lateral deflection and the upper frontal surface becomes inclined to the axis of the housing. This inclination or the lateral displacement is thus a measure for the size of the internal pressure. It may be measured by known means, as for example by reading off from a mirror, by a measuring scale or by suitable lever mechanism. In the device shown, a mirror 6 reflecting a beam of light over a scale is provided for measuring the inclination.

What we claim is:

Apparatus for measuring high pressures comprising a straight tubular body having one end closed and the opposite end open and adapted to be connected to a source of pressure, the bore of said tubular body being eccentric to the central longitudinal axis thereof, whereby a lateral deflection of said tubular body is obtained when subjected to pressure, and measuring means responsive to such lateral deflection.

OTTO HOFFMANN.
WERNER FRANCKE.